United States Patent [19]

Jansen

[11] 3,821,250

[45] June 28, 1974

[54] CHEMICAL PROCESS

[75] Inventor: Gert Peter Jansen, Farum, Denmark

[73] Assignee: Beecham Group Limited, Brentford, Middlesex, England

[22] Filed: Nov. 19, 1971

[21] Appl. No.: 200,520

[30] Foreign Application Priority Data
Dec. 30, 1970 Great Britain.................... 61736/70

[52] U.S. Cl..... 260/329 R, 260/239.1, 260/332.2 A
[51] Int. Cl........................................... C07d 63/12
[58] Field of Search..................... 260/329 R, 454 R

[56] References Cited
OTHER PUBLICATIONS

Cope, et al., Organic Syntheses, Vol. IV, pages 234–237 (1963).

Bailey, et al., Journal of the American Chemical Society, Vol. 81, pages 5397–5399 (October 1959).

*Primary Examiner*—Henry R. Jiles
*Assistant Examiner*—Cecilia M. S. Jaisle

[57] ABSTRACT

Tetrahydrothiophene-3-one is reacted with cyanoacetic acid or a salt or ester thereof to produce the novel mixture of 3-cyano-2,5-dihydrothiophene, 3-cyanomethyl-4,5-dihydrothiophene, and cis and trans-3-cyanomethylenetetrahydrothiophene. This mixture is converted into 3-thienylacetonitrile by dehydrogenation or oxidation. The produced 3-thienylacetonitrile can be further converted to 3-thienylmalonic acid which in turn may be converted to α-carboxy-3-thienylmethylpenicillin or an ester thereof.

8 Claims, No Drawings

CHEMICAL PROCESS

This invention relates to a novel process for the production of 3-thienylacetonitrile, a compound useful as an intermediate in the production of penicillins of the general formula (I):

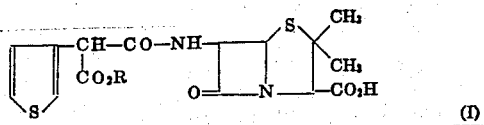

Compounds of general formula (I) in which R is an alkyl, aralkyl or ring substituted aralkyl group are disclosed in our British Patent No. 1,125,557 and compounds of general formula (I) in which R is aryl are disclosed in our British Patent No. 1,133,886. The corresponding α-carboxy penicillin (R = H) is disclosed in our British Patent No. 1,004,670 and further described in our British Patent No. 1,197,973.

In British Patent No. 1,125,557 the penicillin of formula (I) was prepared form a 3-thienylmalonic ester itself synthesised from 3-thienylacetonitrile (see Campaigne et al., J. Amer. Chem. Soc. 1955, 77, 5426). The 3-thienylacetonitrile was prepared from 3-methylthiophene by the method of Campaigne et al. (J. Amer, Chem. Soc., 1948, 70, 1955) which involves reaction with N-bromosuccinimide and treatment of the resulting 3-bromomethylthiophene with sodium cyanide. However, this bromination gives the desired bromo-derivative in low yield and the 3-methylthiophene starting material is unduly expensive.

It has now been found that 3-thienylacetonitrile (and hence 3-thienylmalonic acid and the desired penicillins) can more advantageously be prepared by a new synthetic route starting from tetrahydrothiophene-3-one (II). Compound (II) is readily available, for example, by the cyclisation of esters of β-thioglycolylpropionic acid as described in British Patent Specification No. 570,240 or by the condensation of a thioglycollate ester with an acrylate ester as described by Gianturco et al. in Tetrahedron, 20, 1763, (1964), in each case the initially formed 2-(or 4-) carbalkoxy-3-ketotetrahydrothiophene being hydrolysed and decarboxylated by mild heating. By starting from tetrahydrothiophene-3-one (II) the new synthetic route to the penicillin (I) involves the following stages:

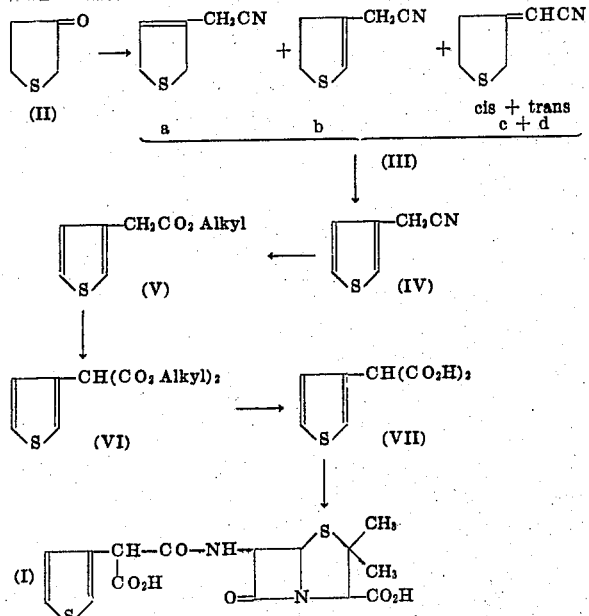

The compounds 3-cyanomethyl-2,5-dihydrothiophene (IIIa), 3-cyanomethyl-4,5-dihydrothiophene (IIIb) and cis and trans 3-cyanomethylene-tetrahydrothiophene (IIIc and IIId) are novel. The method of production of 3-thienyl-acetonitrile (IV) from tetrahydrothiophene-3-one (II)-via compounds (III) is novel.

Accordingly one aspect of the invention provides a process for the manufacture of 3-thienylacetonitrile, which process comprises reacting tetrahydrothiophene-3-one with cyanoacetic acid or a salt or ester thereof; and converting the resulting product to 3-thienylacetonitrile by dehydrogenation or oxidation.

A second aspect of the invention provides the novel mixture of chemical compounds (III) as prepared by the reaction of cyanoacetic acid or salt or ester thereof on tetrahydrothiophene-3-one. This mixture of compounds is useful as a chemical intermediate for example in the above described synthetic route to useful penicillins.

The preferred method of carrying out the process of the invention to prepare the mixture of compounds (III) involves the reaction of (II) with cyanoacetic acid or a salt or ester thereof in a suitable solvent (e.g., benzene, toluene etc.) which generally will be immiscible with water. The reaction involves a decarboxylation sometimes preceded by a hydrolysis step and thus the use of a moderate temperature, and possibly the final presence of acid conditions, may be appropriate.

The ratio of the isomers found in the mixture (III) depends upon the temperature of reaction and the length of heating. An equilibrium composition of roughly 25 (IIIa): 45 (IIIb): 15 (IIIc): 15 (IIId) is obtained on heating at 80°C for 24 hours. While it is possible to separate the individual isomers, this is not necessary in the process of the invention and indeed in this case the mixture of compounds (III) may be further reacted without purification.

The mixture of compounds (III) may be oxidised or dehydrogenated to give 3-thienylacetonitrile by a standard dehydrogenation method e.g., the gaseous phase dehydrogenation over a catalyst, or by the use of an oxidising agent. A particularly advantageous method of dehydrogenation involves the passing of the mixture (III) in a stream of inert gas (e.g., nitrogen) over a catalyst consisting of a transition element or its derivative, the whole being maintained at a temperature above the boiling point of the liquid. Normally, the temperature for dehydrogenation is between 260°C and 650°C, preferably at 430°-530°C.

A preferred catalyst is a partially poisoned tungsten oxide, but the dehydrogenation catalysts that may be employed include, copper chromite (usually activated with barium); metallic copper, platinum or palladium (usually on a substrate such as carbon); bismuth phosphide/molybdenum silicate; nickel/tungsten oxide supported on an aluminosilicate; and molybdenum oxide/alumina. Dehydrogenation may also be effected by heating the compound(s) (III) with a hydrogen acceptor such as anthracene or naphthalene and it is also possible to effect dehydrogenation merely by heating the compound(s) (III) in air. Alternatively, the compound(s) may be treated with bromine or chlorine or a source of positive halogen such as N-bromosuccinimide. Alternatively, an oxidation technique can be employed, for example, by reacting the compound(s) (III) with sodium chlorate, a halogen, sulphur, hydrogen peroxide, organic per-acid or any other convenient organic or inorganic oxidising agent.

It has been found that the yield of compound(s) (IV) is independent of the ratio of isomers in the mixture (III) when a catalyst dehydrogenation technique is employed.

A further aspect of the invention relates to the process for the conversion of 3-thienylacetonitrile (IV) produced as described above into 3-thienylmalonic acid (VII) via an ester of 3-thienylacetic acid (V) and a diester of 3-thienylmalonic acid (VI).

The conversion of 3-thienylmalonic acid into the penicillin of general formula (I) may be carried out by any convenient method. However, those methods described in British Patents Specification Nos. 1,004,670, 1,125,557, 1,133,886 and 1,197,973 may be used with advantage. The group R in formula (I) may be hydrogen, or an alkyl, aryl, aralkyl or ring substituted aralkyl group.

The following examples serve to illustrate the invention:

EXAMPLE 1.

Preparation of 3-thienylmalonic acid (VII).

a. Tetrahydrothiophene-3-one. Methyl thioglycollate (21.2g.) was added to a solution of sodium ethoxide prepared by dissolving sodium (4.6g.) in ethanol (100 ml.). The solution was cooled to 10°C and methyl acrylate (20.6g.) added during 1.5 hr. while maintaining the temperature at 10°–14°C. After stirring for one hour the mixture was poured into 2N sulphuric acid (200 ml.) and refluxed for 3 hours. After cooling the solution was extracted with ether (4×50 ml.) and the organic layer dried over magnesium sulphate. Ether stripping was followed by vacuum distillation to yield tetrahydrothiophene-3-one as a single fraction, b.p. 50°–55°C/3 mm. (12.6g).

b. The Mixture of Four Dihydrothiopheneacetonitriles III. Tetrahydrothiophene-3-one as prepared in (a) above (10.2 g.), cyanoacetic acid (8.5 g.), acetic acid (4.0 ml.), piperidine (2.0 ml.), and benzene (30 ml.) were mixed and heated under reflux in a 100 ml. reaction flask connected with a Dean-Stark type water trap. After 5 hours separation of water (2.3 ml.) and the evolution of carbon dioxide stopped. The clear, light tea-coloured reaction mixture was cooled to 20°C, extracted with 1.5N sodium hydroxide solution (50 ml.) and with potassium hydrogen carbonate solution (50 ml., 20 percent). The mixture was dried over anhydrous sodium sulphate and the solvent distilled off under reduced pressure. The mixture was then fractionally distilled the fraction boiling between 130°–134°C/11 mm. being collected. The yield of the mixture (III) was 11.1 g.

c. 3-Thienylacetonitrile (IV). A 35 cm. quartz tube (10 mm. i.d.) was filled with a partially sulphided tungsten oxide catalyst N-0602 T ⅛ inch from the Harshaw Chemical Company, Cleveland, Ohio. Nitrogen was passed through the tube (50 ml. per min.) which was then heated to 400°–500°C, generally at 460°C, in an electric oven. The mixture (III) (100 g.) as prepared in (b) above with the composition 20:48:16:16 was injected with a syringe into the tube at the end where the nitrogen enters. Injection was continuous over a period of 8 hours and 71 g. of a tea-coloured liquid was collected at the other end of the tube. The purity of the product was 97 percent. In a similar experiment the starting material had the composition 38:50:6:6. The yield obtained from this reaction was identical to that described above.

d. Ethyl 3-thienylacetate (V) was prepared from 3-thienylacetonitrile (IV) as prepared in (c) above.

e. Diethyl 3-thienylmalonate (VI) was prepared from Ethyl 3-thienylacetate (V) as prepared in (d) above. 3-Theinylmalonic acid (VII) was prepared from diethylmalonate (VI) as prepared in (e) above.

EXAMPLE 2.

Preparation of 3-thienylmalonic acid (VII). To 2.5 g. of the mixture (III) prepared as in Example 1 a–b and acetic acid (20 ml.) was added bromine (3.53 g.) at 10°–13° dropwise with stirring over a period of 15 mins. The yellow reaction mixture was heated at 40° for 15 min., and then distilled at 9 mm. pressure. The fraction boiling at 113°–130° was collected (0.89 g.) The material contained 0.71 g. (29 percent) of (IV) and 0.18 g. (7 percent) of III (glc). The 3-thienylacetonitrile (IV) was then converted into 3-thienylmalonic acid (VIII) as described in Example 1, d–f.

EXAMPLE 3.

Preparation of 3-thienylmalonic acid (VII). Into the mixture (III) (5.1 g) prepared as in Example 1, a–b and ether (50 ml) was passed chlorine (3.5 g) at −5° to 0° with stirring over a period of 20 min. A 20 percent solution of potassium hydrogen carbonate (60 g) was added to the colourless reaction mixture dropwise with stirring. The ethereal phase was separated and the aqueous phase extracted with ether (20 ml). The combined ethereal extracts were dried over anhydrous magnesium sulphate and distilled. The fraction boiling at 72°–107° at 0.1 mm. pressure was collected (2.18 g). The material contained 2.06 g (41 percent) of IV and 0.12 g (2 percent) of III (glc). The 3-thienylacetonitrile (IV) was then converted into 3-thienylmalonic acid (VII) as described in Example 1, d–f.

EXAMPLE 4.

Preparation of 3-thienylmalonic acid (VII) A solution of III (1.86 g) prepared as in Example 1, a–b in carbon tetrachloride (13 ml) was added dropwise with stirring over a period of 35 min. into a suspension of N-bromosuccinimide (2.66 g) and benzoyl peroxide (60 mg) in carbon tetreachloride (20 ml) at 24°–30°. The yellow suspension was heated under reflux (10 min.). The dark tea-coloured suspension was filtered and evaporated to dryness from a water bath (44°) at 50 mm. pressure. The yellowish brown, oily residue was dissolved in a solution of sodium methoxide (1.35 g) in methanol (25 ml). The solution was heated under reflux (1 h.). About 15 ml of methanol was removed by distillation. Water (15 ml) was added and the solution brought to pH 1 by addition of concd. hydrochloric acid (3.5 ml). The solution was extracted with four 20 ml portions of ether. The combined ethereal extracts were dried over anhydrous sodium sulphate and distilled. The fraction boiling at 123°–160° at 12 mm pressure was collected (0.72 g). The material contained 0.35 g (19 percent) of IV and 0.37 g (20 percent) of III (glc). The 3-thienylacetonitrile (IV) was then converted into 3-thienylamonic acid (VII) as described in Example 1, d–f.

EXAMPLE 5.

Preparation of 3-thienylmalonic acid (VII) III (1.5 g) as prepared in Example 1, a–b was added to a suspension of sodium chlorate (0.42 g) in methanol (25 ml). Bromine (about 100 mg) was added to the stirred suspension. The temperature of the reaction mixture rose over a period of 90 min. from 20° to 29°. At this time the mixture had become a clear light yellow solution. Another 200 mg of bromine was added. The temperature rose almost instantly to 39° and then fell slowly. After stirring for 15 hrs. the mixture was evaporated almost to dryness from a water bath under reduced pressure. Water (35 ml) was added to the resulting suspension. The solution was extracted with ether, and the ethereal extract dried over anhydrous magnesium sulphate and evaporated to dryness from a water bath (45°) at 14 mm pressure. The red, liquid residue (1.52 g) was found (glc) to contain 0.45 g of IV (30 percent) and 0.68 g of III (45 percent). The 3-thienylacetonitrile was then converted into 3-thienylmalonic (VII) acid as described in Example 1, d–f.

EXAMPLE 6.

Preparation of 3-thienylmalonic acid (VII). To III (1.25 g) prepared as in Example 1, a–b in acetic anhydride (20 ml) was added a 34.6 percent hydrogen peroxide solution (1.0 g) dropwise with stirring over a period of 5 min. at 25°. The light yellow solution was allowed to stand at 30° overnight with stirring, and then heated to 124° over a period of 1 h. The resulting tea-coloured reaction mixture was found (glc) to contain 0.32 g of IV (26 percent) and 0.08 g of III (6 percent). The 3-thienylacetonitrile (IV) was then converted into 3-thienylmalonic acid (VII) as described in Example 1, d–f.

EXAMPLE 7.

Preparation of 3-thienylmalonic acid (VII). III (2.5 g) prepared as in Example 1, a–b sulphur (0.7 g) and potassium hydrogen sulphate (0.14 g) were placed in an 8 ml distillation flask. The mixture was heated to 160° over a period of 15 min. and kept there for 30 min. Hydrogen sulphide was evolved. The dark tea-coloured reaction mixture was distilled at 10 mm pressure. All distillable material was collected until the temperature of the distilland was 200°. The distillate (1.25 g) contained 0.82 g (33 percent) of IV and 0.43 g (17 percent) of III (glc). The 3-thienylacetonitrile (IV) was then converted into 3-thienylmalonic acid (VII) as described in Example 1, d–f.

EXAMPLE 8.

Preparation of 3-thienylmalonic acid (VII). III (1.91 g) prepared as in Example 1, a–b, chloranil (3.94 g) and dimethylformamide (9 ml) was mixed and heated with stirring under reflux (40 min.). The viscous, dark suspension was cooled to room temperature. The sticky mixture was extracted with three 15 ml portions of ether and combined ethereal extracts distilled. The fraction boiling at 117°–128° at 12 mm pressure was collected (0.59 g). The material contained 0.57 g (30 percent) of IV and 0.02 g (1 percent) of III (glc). The 3-thienylacetonitrile (IV) was then converted into 3-thienylmalonic acid (VII) as described in Example 1, d–f.

EXAMPLE 9.

Preparation of 3-thienylmalonic acid (VII). III (1.44 g) prepared as described in Example 1, a–b, 2,3-dichloro-5,6-dicyano-1,4-benzoquinone (2.62 g) and dioxane (23 ml) were mixed with stirring. The temperature of the suspension rose to 37° within a few minutes. The mixture was heated under reflux (4 hrs.). The reddish-brown suspension was cooled and filtered. The filtrate was evaporated to dryness from a water bath (70°) at 15 mm pressure. The reddish, liquid residue (1.5 g) was dissolved in ether (20 ml), the ethereal solution washed with water (20 ml), dried over anhydrous magnesium sulphate and distilled. The fraction boiling at 57°–60° at 0.1–0.2 mm pressure was collected (0.53 g). The material consisted of 0.46 g (33 percent) of IV and 0.07 g (5 percent) of III (glc.) The 3-thienylacetonitrile (IV) was then converted into 3-thienylmalonic acid (VII) as described in Example 1, d–f.

EXAMPLE 10.

Preparation of 3-thienylmalonic acid (VII). III (1.25 g) prepared as described in Example 1, a–b, 2, 2$^1$-azolis (2-methylpropionitrile) and dioxane (20 mm) were mixed and heated with stirring (20 hrs.) at 60°. The almost clear light yellowish-green reaction mixture was cooled and filtered. The filtrate was found by (glc) to contain 0.38 g (31 percent) of IV and 0.18 g (14 percent) of III. The 3-thienylacetonitrile (IV) was then converted into 3-thienylmalonic acid (VII) as described in Example 1, d–f.

I claim:
1. A process for the production of 3-thienylacetonitrile, which comprises
   a. hydrolysing and decarboxylating tetrahydrothiophene-3-one by reaction with cyanoacetic acid or a salt or ester thereof; and
   b. dehydrogenating the resulting product
      1. by gaseious phase dehydrogenation over a catalyst;
      2. by heating said product with a hydrogen acceptor;
      3. by heating said product in air; or
      4. by treating said product with bromine, chlorine or a source of positive halogen; or
   c. oxidising said product with an organic or inorganic oxidising agent,
to form 3-thienylacetonitrile.

2. A process according to claim 1 wherein tetrahydrothiophene-3-one is reacted with cyanoacetic acid or a salt or ester thereof in a solvent which is immiscible with water.

3. A process according to claim 1 wherein the resulting product is subjected to gaseous phase dehydrogenation over a suitable catalyst at a temperature between 260°C. and 650°C. to produce 3-thienylacetonitrile.

4. A process according to claim 3 wherein the catalyst for the dehydrogenation is copper chromite, copper chromite activated with barium, metallic copper, platinum, palladium, palladium on a carbon substrate, bismuth phosphide/molybdenum silicate, nickel/tungsten oxide supported on an aluminosilicate or molybdenum oxide/alumina.

5. A process according to claim 3 wherein the catalyst for the dehydrogenation is a partially poisoned tungsten oxide.

6. A process according to claim 1 wherein the resulting product is subjected to oxidation using bromine or chlorine to produce 3-thienylacetonitrile.

7. A process according to claim 6 wherein the resulting product is subjected to oxidation using chlorine to produce 3-thienylacetonitrile.

8. A mixture of compounds 3-cyanomethyl-2,5-dihydrothiophene, 3-cyanomethyl-4,5-dihydrothiophene and cis- and trans-3-cyanomethylenetetrahydrothiophene.

* * * * *